United States Patent [19]

Best et al.

[11] 4,433,412

[45] Feb. 21, 1984

[54] METHOD AND APPARATUS FOR TESTING AND VERIFYING THE OPERABILITY OF REGISTER BASED STATE MACHINE APPARATUS

[75] Inventors: David W. Best, Marion; Jeffrey D. Russell, Cedar Rapids, both of Iowa

[73] Assignee: Rockwell International Corporation, El Segundo, Calif.

[21] Appl. No.: 264,179

[22] Filed: May 15, 1981

[51] Int. Cl.³ ............................................. G06F 11/00
[52] U.S. Cl. ........................................ 371/25; 371/16
[58] Field of Search ...................... 371/25, 21, 16, 20, 371/24; 364/200 MS File, 900 MS File

[56] References Cited

U.S. PATENT DOCUMENTS

| | | | |
|---|---|---|---|
| 3,439,343 | 4/1969 | Stahle | 371/21 |
| 3,562,711 | 7/1968 | Davis et al. | 371/25 |
| 3,579,199 | 5/1971 | Anderson et al. | 371/21 |
| 3,924,181 | 12/1975 | Alderson | 371/25 |
| 3,961,252 | 6/1976 | Eichelberger | 371/25 |
| 4,034,195 | 7/1977 | Bates | 371/25 |
| 4,176,780 | 12/1979 | Sacher et al. | 371/25 |
| 4,243,937 | 1/1981 | Multani et al. | 371/25 |
| 4,312,067 | 1/1982 | Shirasaka | 371/25 |
| 4,317,200 | 2/1982 | Wakatsuki et al. | 371/25 |
| 4,368,532 | 1/1983 | Imazeki et al. | 371/21 |
| 4,369,511 | 1/1983 | Kimura et al. | 371/25 |

Primary Examiner—Jerry Smith
Assistant Examiner—Gary V. Harkcom
Attorney, Agent, or Firm—Bruce C. Lutz; Howard R. Greenberg; H. Fredrick Hamann

[57] ABSTRACT

When a state machine such as a computer is inoperative, the flow of data can occur in so many different ways that it is at times difficult to ascertain the portions of the state machine that are causing the problems. Whether the problems are caused by original design or later failure of components, the present invention can determine at least the general area of the problem and often the specific bit introducing the problem, by setting a predefined control bit pattern into a register and ascertaining whether or not the bit pattern returned to the register after a predefined sequence of operations matches design expectations. As illustrated, this may take the form of serially inserting data into a normally parallel operated register to form the predefined control bit pattern, which then is applied to a sequencer whose output address is used to address a word in ROM, and the addressed word as well as the address itself, is loaded into the register. The address and addressed word are then compared with design expectations to determine whether or not there is a problem with that particular instruction or that particular location in ROM.

6 Claims, 2 Drawing Figures

METHOD AND APPARATUS FOR TESTING AND VERIFYING THE OPERABILITY OF REGISTER BASED STATE MACHINE APPARATUS

INVENTION

The present invention is generally concerned with electronics and more specifically concerned with register based state machines. Even more specifically, it is concerned with the means and apparatus for testing the operability of a state machine.

Prior art methods of testing state machines have differed widely over the years, but normally used fairly simple techniques of applying probes to the inputs and outputs of various registers and ROM's to ascertain whether or not the device was operating in accordance with design expectations. As devices became smaller and test leads became more precious (not enough space to include test leads), these procedures altered somewhat in ascertaining problem areas. The advent of large scale integration (LSI) has often resulted in very time consuming examination of the device to ascertain design errors. When a problem occurred in the area of failed devices, the solution has often been to discard the failed device and replace it with a new chip since the testing involved so much work.

The present invention improves upon the prior art by inserting a word into the instruction register in the case of a computer and checking the results. An example may be where a JUMP instruction is inserted into the instruction register for operating through a microsequencer to address a ROM. The ROM outputs an addressed word to the register. In the present invention, the register also receives the address used to address that ROM. If the address is correct, the microsequencer is assumed to be operating properly. If the addressed word is correct, the ROM for that particular address is assumed to be operating satisfactorily. On the other hand, if the address is as designed and the addressed word is not as designed, either the ROM or the interface between the ROM and the register is faulty. Checking several other addresses will normally determine whether or not it is the ROM or the interface mechanism. By the process of logical elimination, almost any circuit or component within a state machine such as a computer can be checked. In other words, many portions of the data path section, as well as the ROM, can be checked in a logical manner to eliminate various portions as possible trouble sources. The end result of the checking and logical elimination is to leave only a few, and normally only a single component, as the potential trouble spot. Once the general or specific area is isolated, other techniques can be utilized to determine the exact cause of the problem.

In view of the above, it is a general object of the present invention to provide improved testing capabilities in all state machines.

Other objects of this invention may be ascertained from a reading of the specification and appended claims in conjunction with the drawings wherein:

DETAILED DESCRIPTION

Figure 1:
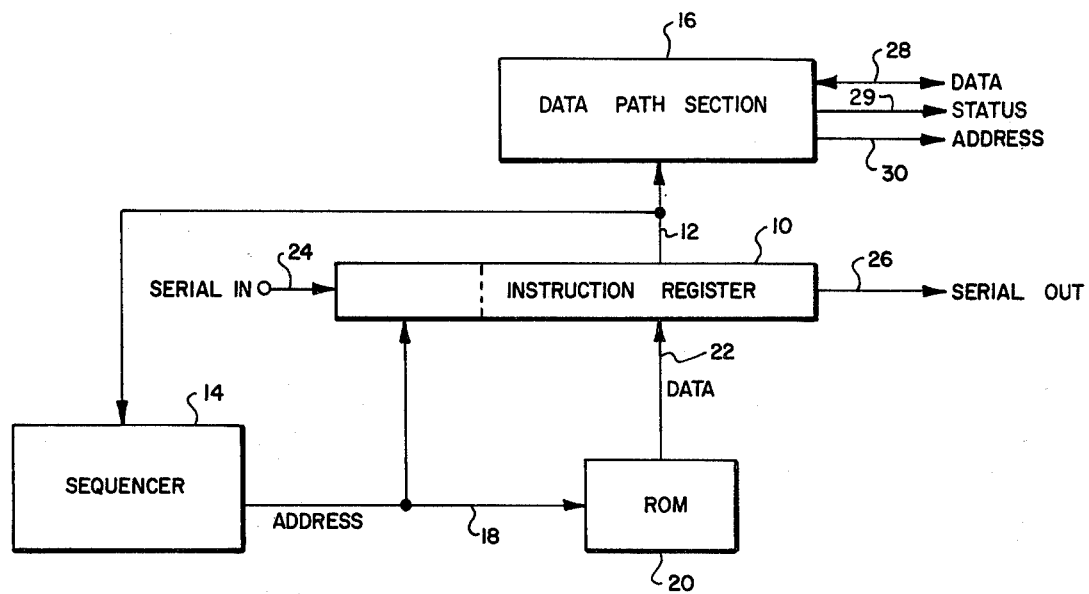
FIG. 1 is a block diagram of the inventive concept.

In FIG. 1, a microinstruction register or any other type of state control register 10, outputs data normally in parallel on a set of leads 12 to a sequencer block 14 as well as to a data path section 16. The sequencer 14 outputs addresses on a set of leads 18 as dictated by the particular instruction received on lead 12. These addresses on leads 18 are normally in parallel and are applied to a first section of the register 10, as well as to a ROM 20. The response (addressed word) to the address supplied to ROM 20 data is output in parallel on a set of leads 22 to a second portion of register 10. Register 10 also contains a serial data input lead 24 and a serial data output lead 26. The data paths section 16 receives and supplies data on leads 28, supplies status signals on lead 29, and outputs addresses to other areas of the state machine on leads 30.

Figure 2:
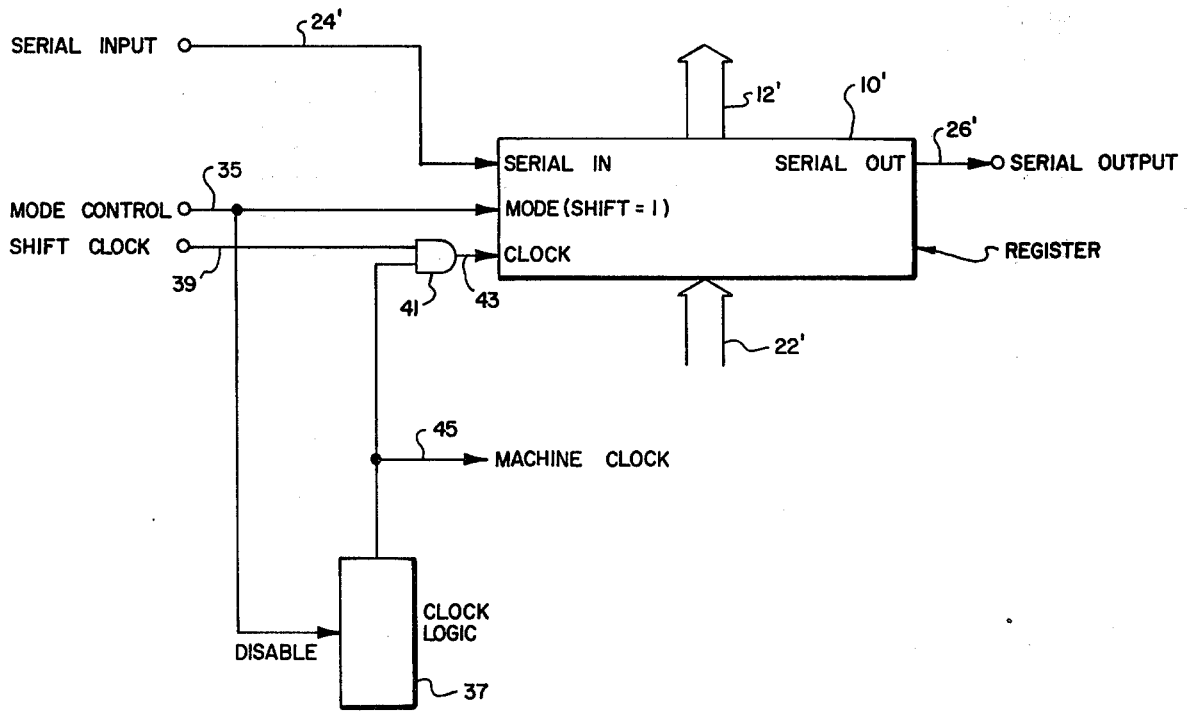
FIG. 2 is a circuit block diagram showing more detail in the instruction register portion of FIG. 1.

In FIG. 2, a serial input 24' is illustrated supplying data to a block 10', having a serial output 26'. Also illustrated are parallel output leads 12' and parallel input leads 22'. Thus far, all the designations use the same nomenclature as provided in FIG. 1 with the addition of prime to indicate that it is relevant to FIG. 2. In addition, to those numbers used in FIG. 1, there is a mode control lead 35 supply mode signals to the register 10 and to a clock logic block 37. A shift clock lead 39 supplies signals to an AND gate 41 which supplies clock input signals on a lead 43 to a register 10'. The clock logic block 37 supplies machine clock signals on a lead 45 to other portions of the state machine circuitry as well as providing a second input to AND gate 41.

OPERATION

A normal way to test an electronic circuit is to check an output signal of a component when a given input signal is applied. In the past, this has been easy where there has been discrete components, such as encased transistors mounted on circuit boards and operating as part of a complete system to form a register based state machine such as a computer. However, as these components have become more and more compact and especially with today's present LSI, there is a very limited availability of test points for accessing the input and output data. One prior art approach to testing, where separate ROM chips have been used in a state machine, has been to remove the ROM chip and insert the test signals into the leads normally connected to the ROM. Where the ROM is incorporated as part of the total LSI chip or package, the difficulties with testing individual components again presents a problem. The present inventive concept does not require any more than three (24', 35 and 39) leads to implement testing of a substantial portion of a register based state machine.

Before continuing, it is necessary that certain clauses or words be defined. For the purposes of this specification, a "state" is a single group or set of logic values. A "state machine" is a device which can assume more than one set of logic values. A "register based state machine" is a state machine or other device in which the current (present) state is held in a register and the current state is replaced by the next state at a given increment in time as determined by a master timing signal which procedurely increments the logic states of the device in a manner as determined from the current machine state. The "current state" is an instruction which will produce a known result. A "register" is a device for holding a group or set of logic values for a period of time as determined by the design of the register. By definition an "instruction" (this also includes microinstructions) is a predefined bit pattern held in a control memory which is used to control the state transition of a state machine. The control memory can be either ROM or RAM.

The drawing of FIG. 1 represents a standard computer configuration except for the added portions of the left-hand section of instruction register 10, its address input lead and the serial in and serial output leads 24 and 26, respectively. In other words, the normal sequence of events in testing a state machine, such as a computer, is that a microinstruction is inserted into register 10 from a keyboard, a computer program or some such other means. This instruction is output on lead 12 and applied to the sequencer 14 which decodes the information and either operates certain sequences within device 14 or in the data path section 16, which causes the sequencer 14 to output an address on lead 18 to ROM 20. The address applied to ROM 20 produces an addressed word which is output on lead 22 in parallel format to register 10. This information causes a new instruction to be generated. This instruction may then be used for further control of the data path section 16 and the sequencer section 14, or may be examined to determine if that portion of the state machine is operating properly. The operations performed by the data path section 16 may be observed on the address leads 30, the status leads 29, and the data leads 28, to verify the correct operation of the data path section. Since all of the devices referenced to date are on a single chip and since leads are at a great premium in LSI devices, there is no simple method of accessing the internal parts so as to determine whether or not the signals (addressed words) being output by a device, such as ROM 20, are those desired with a given address input.

The present invention adds a serial input lead 24 and a serial output lead 26 to accomplish a testing of the ROM for a given address. In other words, if a given instruction such as a JUMP to a specific address instruction is inserted in register 10, this JUMP instruction will pass right through sequencer 14 with an address on lead 18 to ROM 20. The output from ROM 20 then should be the instruction which is designed into ROM 20. If the output addressed word on leads 22 is correct, it may be assumed that everything is working properly in the ROM. All of the rest of the ROM addresses can be used with the JUMP instruction and, in each instance, the output from ROM 20 is compared to the design addressed word and if every addressed word coincides with design criteria, the ROM device is assumed to be correct. If, however, a very few of the address words do not coincide with design criteria, it could either be a problem with those particular addresses in the sequencer 14 or it could be the memory within ROM 20 itself. By taking the address applied to ROM 20 and placing this address in a separate section of register 10, it can be ascertained whether or not the correct address was used in response to the JUMP instruction. If the address is incorrect for a given JUMP instruction, it may be assumed that the trouble is prior to ROM 20. However, if the address is correct and most other addresses produce correct results, it may safely be assumed that the problem is in given registers or sets of memory elements within ROM 20. The addresses used to initiate a given sequence are input on lead 24 and after data is returned on lead 22, the addressed word can be output on lead 26.

As more completely illustrated in FIG. 2, the register 10′ is clocked and shifted in mode (between logic one and logic zero) to obtain the desired result. A testing of the ROM for verification of design results or testing to ascertain whether or not a particular memory element has failed can be accomplished by first serially loading a JUMP instruction via lead 24′ into register 10′ for jumping to a given ROM address. The mode is changed by altering the lead 35 to a logic one to enable serial shifting of the JUMP instruction into register 10′. This logic one will also operate to disable the clock logic block 37 and therefore prevent further clock signals from being applied on lead 45 while still allowing shifting of the register 10′. The mode control is then changed to a logic zero for a predetermined number of clock cycles as supplied by clock 45 for the given JUMP instruction. This allows the device to operate in a normal mode of "parallel in" and "parallel out". When the given number of clock cycles is completed, the mode signal is again returned to logic one for unloading the addressed word from register 10 as input on lead 22′ and verifying that the addressed word coincides with design specifications for that address. The procedure is repeated for all ROM locations. Other instructions also are used from register 10′ together with signals from the data path section 16 to access the ROM and these instructions may also be inserted and the signal or addressed word checked by outputting the information on lead 26′ to a comparing register for the purpose of verification of operation.

Similarly, an instruction may be loaded into register 10 which instruction is configured to cause a predetermined sequence of operations in the data path section 16. The results of the operations may then be observed on the data leads 28, the status leads 29, and the address leads 30, as well as through the effect on the sequencer section 14 through the addressed ROM word as previously described.

While the present inventive concept was designed specifically for large scale integration devices employing registers in a state machine, the technique is applicable to any type of computer or state machine and is not limited to large scale integration. While the techniques used in the past operated to fill a need, the present technique is applicable to automation techniques, thereby reducing the human test error factor involved and should prove invaluable to any type of register based state machines.

While I have illustrated a single embodiment of the inventive concept, it is to be realized that the concept will work with any type of register based state machine and this is merely the best implementation known at the date of filing.

Thus, we wish to be limited only by the scope of the appended claims, wherein we claim:

1. State machine test apparatus comprising, in combination:
   instruction register means including an address section and a data path section;
   read only memory (ROM) means, connected to said register means for supplying addressed words thereto in response to receipt of appropriate input address signals;
   sequencer means connected between said register means and said ROM means for supplying said input address signals to both said ROM means and to said address section of said register means in response to receipt of appropriate control signals from said register means;
   test signal supply means, connected to said register means, for supplying predetermined instructions to said register means whereby addressed words are returned to said register means from said ROM means; and test signal apparatus output means for outputting from said register means both the addressed word returned by said ROM means in response to a predetermined instruction as supplied by said test signal supply means and the address last stored in said register means from said sequencer means, whereby the outputted word can be compared to a predetermined desired response.

2. Apparatus for testing a section of a microprocessor including a read only memory comprising, in combination:

register means including serial control input means, parallel addressed word input means, parallel control bit pattern output means, and serial verification output means;

means for initially setting the logic states of said register means to a predefined control bit pattern by serially entering said pattern by said serial control input means;

read only memory (ROM) means, including instruction sequencing means, connected between said control bit pattern output means of said register means and said addressed word input means of said register means in a feedback manner for loading the next instruction in an instruction set into said register means from said read only means upon occurrence of a clock signal;

means for operating the microprocessor for a predetermined number of clock cycles; and means for comparing the logic bits of the received addressed word serially removed from said register by said serial verification output means with a predetermined standard for the control bit pattern.

3. Apparatus as claimed in claim 2 comprising in addition means for comparing the address supplied to said ROM means in each test with a predetermined address for each control bit pattern.

4. Apparatus for testing a memory programmed control state machine comprising, in combination:

register means including serial and parallel input means, clock means and serial and parallel output means, said register means normally operating with parallel inputs and parallel outputs and upon command operating with either serial inputs or serial outputs;

means connected to said clock means to supply clock signals to said register means;

read only memory means, including sequencing means, connected between said parallel output means of said register means and said parallel input means of said register means and connected to said clock means for providing a feedback next instruction of an instruction set to said register means from said read only memory means in accordance with received clock signals;

means connected to said serial input means of said register means for serially shifting an instruction into said register means;

means for operating the control state machine for a predetermined number of clock cycles; and means for serially shifting the addressed word from said serial output means of register means.

5. Apparatus as claimed in claim 4 wherein the signal serially shifted from said register means is compared with a predetermined result word.

6. Apparatus as claimed in claim 4 comprising in addition:

means connected to said register means for storing therein the address supplied to said memory means; and means for serially shifting said address from said register means along with said addressed word.

* * * * *